United States Patent
Isozaki et al.

(10) Patent No.: US 9,803,257 B2
(45) Date of Patent: Oct. 31, 2017

(54) HIGH-STRENGTH STAINLESS STEEL PIPE

(75) Inventors: Seiichi Isozaki, Yamaguchi (JP);
Yasutoshi Hideshima, Yamaguchi (JP);
Hiroshi Fujimoto, Yamaguchi (JP);
Satoshi Suzuki, Yamaguchi (JP)

(73) Assignee: NISSHIN STEEL CO., LTD., Tokyo (JP)

( * ) Notice: Subject to any disclaimer, the term of this patent is extended or adjusted under 35 U.S.C. 154(b) by 1077 days.

(21) Appl. No.: 13/263,124

(22) PCT Filed: May 7, 2009

(86) PCT No.: PCT/JP2009/058635
§ 371 (c)(1),
(2), (4) Date: Oct. 6, 2011

(87) PCT Pub. No.: WO2010/128545
PCT Pub. Date: Nov. 11, 2010

(65) Prior Publication Data
US 2012/0024430 A1  Feb. 2, 2012

(51) Int. Cl.
| | |
|---|---|
| *C21D 9/50* | (2006.01) |
| *C21D 6/00* | (2006.01) |
| *C21D 8/10* | (2006.01) |
| *C21D 9/08* | (2006.01) |
| *C21D 9/14* | (2006.01) |
| *C22C 38/02* | (2006.01) |
| *C22C 38/04* | (2006.01) |
| *C22C 38/18* | (2006.01) |
| *C22C 38/40* | (2006.01) |
| *C22C 38/00* | (2006.01) |
| *C22C 38/42* | (2006.01) |

(52) U.S. Cl.
CPC .............. *C21D 9/50* (2013.01); *C21D 6/002* (2013.01); *C21D 6/004* (2013.01); *C21D 6/008* (2013.01); *C21D 8/10* (2013.01); *C21D 8/105* (2013.01); *C21D 9/08* (2013.01); *C21D 9/14* (2013.01); *C22C 38/002* (2013.01); *C22C 38/02* (2013.01); *C22C 38/04* (2013.01); *C22C 38/18* (2013.01); *C22C 38/40* (2013.01); *C22C 38/42* (2013.01); *C21D 2211/005* (2013.01); *C21D 2211/008* (2013.01); *Y02P 10/212* (2015.11)

(58) Field of Classification Search
CPC .......... C21D 6/002; C21D 6/008; C21D 8/10; C21D 8/105; C21D 9/08; C21D 9/14; C21D 9/50; C21D 2211/005; C21D 2211/008; C21D 6/004; C22C 38/02; C22C 38/04; C22C 38/18; C22C 38/40; C22C 38/002; C22C 38/42; Y02P 10/212

USPC .................... 148/325, 336; 420/34; 138/171
See application file for complete search history.

(56) References Cited

FOREIGN PATENT DOCUMENTS

| | | |
|---|---|---|
| CN | 1906319 A | 1/2007 |
| JP | 61-12826 A | 1/1986 |
| JP | 4-268018 A | 9/1992 |
| JP | 9-263826 A | 10/1997 |
| JP | 2002-363712 A | 12/2002 |
| JP | 2004-225075 A | 8/2004 |
| JP | 2004-244691 A | 9/2004 |
| JP | 2004-359971 A | 12/2004 |
| JP | 2005230909 A | 9/2005 |
| JP | 2005-336599 A | 12/2005 |
| JP | 2006-274436 A | 10/2006 |
| JP | 2009-114471 A | 5/2009 |

OTHER PUBLICATIONS

Ishizuka et al., English machine translation of JP 2005-230909 from the IDS, Sep. 2005, p. 1-18.*
Tomimura et al., English machine translation of JP 2004-359971, Dec. 2004, p. 1-16.*
Washko et al., "Wrought Stainless Steels—Fabrication Characteristics", ASM Handbook, 1990, ASM International, vol. 1, p. 1-40.*
Chinese Office Action issued in Chinese Patent Application No. 200980150633.8 dated Oct. 18, 2012.
Chinese Office Action issued in Chinese Patent Application No. 200980150633.8 dated Apr. 28, 2013.
"Buxiugang Hanjie Gangguan", http://img2.duxiu.com/n/printing.htm, Apr. 16, 2013. Partial Translation.
European Search Report issued in European Application No. 09844332.8-1362 dated Mar. 27, 2014.

* cited by examiner

*Primary Examiner* — Roy King
*Assistant Examiner* — Caitlin Kiechle
(74) *Attorney, Agent, or Firm* — McDermott Will & Emery LLP

(57) ABSTRACT

A stainless steel material having compositions which contain on the basis of percent by mass, C from 0.04 to 0.12%, Ni from 0 (including a case of no addition) to 5.0%, Cr from 12.0 to 17.0%, N from 0.0 to 0.10%, Si from 0.2 to 2.0%, Mn at 2.0% or less, Cu from 0.0 to 2.0%, P at 0.06% or less, S at 0.006% or less, with residue being Fe and unavoidable impurities. Further, a parent phase has any one of a single phase structure of ferrite phase or martensite phase and a diploid phase structure of ferrite phase and martensite phase. An end of the base material is melt-welded as a joint to form a pipe. The parent phase is provided with carbide uniformly separated at grain boundaries and within grains, with a dissolved amount of C being 0.03% by mass or less.

1 Claim, No Drawings

HIGH-STRENGTH STAINLESS STEEL PIPE

CROSS REFERENCE TO PRIOR APPLICATIONS

This application is a U.S. National Phase application under 35 U.S.C. §371 of International Application No, PCT/JP2009/058635, filed on May 7, 2009. The International Application was published in Japanese on Nov. 11, 2010 as WO 2010/128545 A1 under PCT Article 21(2). All of these applications are herein incorporated by reference.

TECHNICAL FIELD

The present invention relates to a high-strength stainless steel pipe which is used for transportation, machine construction, architecture, decoration, etc., and in particular relates to a high-strength stainless steel pipe which is favorably used in such applications that require strength and corrosion resistance.

BACKGROUND ART

A stainless steel, material is excellent in corrosion resistance and also favorable in strength, workability and joint characteristics. Therefore, a stainless steel pipe formed with the stainless steel material is used in various applications due to excellent corrosion resistance and high strength.

Further, in recent years, since reduction in cost has been requested, high-strength stainless steel pipes to be used are required for improving the corrosion resistance and strength without containing expensive elements Then, on the basis of percent by mass, a 12% Cr martensite-based stainless steel material is primarily used, with the content of Cr increased and the contents of C and N decreased, further Cr, Ni, Mo and Cu are contained in proper amounts to provide a composition. Then, a diploid phase structure is formed with a ferrite phase and a residual austenite phase, with the martensite phase given as a base phase, thereby providing a stainless steel pipe which is improved in strength, hot workability, corrosion resistance and weldability (refer to Patent Document 1, for example)

Further, on the basis of percent by mass, with the content of N decreased to 0.015% or less, a martensite-based stainless steel material is welded to form a stainless steel pipe. Thereafter, the pipe is austenized at 920° C. to 1100° C., cooled at a cooling velocity greater than water cooling, subjected to tempering, and cooled at a cooling velocity greater than air cooling, thereby providing a high-strength stainless steel pipe in which martensite is formed. This high-strength stainless steel pipe is sufficient in corrosion resistance even in a carbon dioxide atmosphere and also excellent in impact toughness and weldability (refer to Patent Document 2, for example).

Still further, with regard to the metallic structure, a proper amount of ferrite phase is introduced into a parent phase of austenite to give a two phase structure based on austenite which contains 5 to 40% by volume of ferrite phase, thereby providing a stainless steel pipe with improved workability and corrosion resistance (refer to Patent Document 3, for example).

A stainless steel pipe in which Mo and V are combined with a ferrite-based stainless steel material in proper contents to improve corrosion resistance, and hot rolling conditions and cold rolling conditions are specified to suppress reduction in workability clue to the content of Mo is also available (refer to Patent Document 4, for example).

CITATION LIST

Patent Literature

PTL 1: Japanese Published Unexamined Patent Application No. 2005-336599 (page 2 to 7, FIG. 1)
PTL 2: Japanese Published Unexamined Patent Application No. 4-268018 (page 2 to 3)
PTL 3: Japanese Published Unexamined Patent Application No. 2004-225075 (page 2 to 3, FIG. 1)
PTL 4: Japanese Published Unexamined Patent Application No. 2002-363712 (page 2 to 3, FIG. 1)

SUMMARY OF INVENTION

Technical Problem

However, the stainless steel material described in Patent Document 1 is 689 MPa or lower in tensile strength and it is desirable to improve the strength. Further, since Mo, a relatively expensive element, is contained, there is a problem of increased costs.

Further, the stainless steel material described in Patent Document 2 is favorable in corrosion resistance and impact toughness but it is desirable to improve the strength. Still further, since Co which is a relatively expensive element is contained, there is a problem of increased costs.

The stainless steel materials described in Patent Document 3 and Patent Document 4 are formed into pipes in a state after final annealing and used without being subjected to heat treatment after pipe formation. Therefore, these pipes are excellent in workability, however, there is a problem in which high strength cannot be obtained.

The present invention has been made in view of the above situation, an object of which is to provide a high-strength stainless steel pipe favorable in strength and corrosion resistance and which can be produced at low costs.

Solution to Problem

The present disclosure describes a high-strength stainless steel pipe in which, as a base material, there is provided a stainless steel material which contains on the basis of percent by mass, C from 0.04 to 0.12%, Ni from 0(including a case of no addition) to 5.0%, Cr from 12.0 to 17.0%, N from 0 (including a case of no addition) to 0.10%, Si from 0.2 to 2.0%, Mn at 2.0% or less, Cu from 0 (including a case of no addition) to 2.0%, P at 0.06% or less, S at 0.06% or less, with residue being Fe and unavoidable impurities, and in which a parent phase is constituted with any one of a single phase structure of ferrite phase, a single phase structure of martensite phase and a diploid phase structure of ferrite phase and martensite phase, and the high-strength stainless steel pipe in which an end of the base material is melt-welded as a joint to form a pipe, the parent phase is provided with carbide uniformly separated at grain boundaries and within grains and adjusted to be 0.03% or less in a dissolved amount of C, and the joint has a molten structure resulting from melt welding.

The parent phase and the joint are those in which separated carbide is dissolved by heat treatment after pipe formation.

The parent phase and the joint after heat treatment are constituted with a single phase structure of martensite phase or a diploid phase structure of martensite phase and ferrite phase.

Advantageous Effects of Invention

The parent phase of the stainless steel material is constituted with any one of a single phase structure of ferrite phase, a single phase structure of martensite phase and a diploid phase structure of ferrite phase and martensite phase by specifying compositions. Thereby, the parent phase is structured to contain the martensite phase after pipe formation, thus making it possible to improve the strength.

Further, since the compositions are constituted only with elements used in ordinary stainless steel materials, the pipe can be produced at low cost.

It is possible to prevent reduction in workability of the stainless steel material at the time of pipe formation resulting from the fact that carbide is uniformly separated at grain boundaries and within grains of the parent phase and the carbide is thereby separated locally at the grain boundary to reduce toughness. It is also possible to prevent reduction in corrosion resistance by decreasing a dissolved amount of Cr due to local separation of the carbide at the grain boundary.

The dissolved amount of C in the parent phase is adjusted to be 0.03% by mass or less, thus making it possible to prevent the increase in work loads and occurrence of work defects on the surface at the time of pipe formation due to excessively high strength. It is also possible to prevent reduction in corrosion resistance due to the fact that an amount of separated carbide is increased with an increase in the dissolved amount of C and a dissolved amount of Cr is decreased due to the formation of the separated carbide.

Carbide separated on the parent phase and the joint is dissolved in the parent phase and the joint by heat treatment after pipe formation. It is, therefore, possible to improve the strength and corrosion resistance of the parent phase and the joint after pipe formation. Since a state that carbide is separated at the time of pipe formation prior to heat treatment is developed, the pipe can be formed easily.

The parent phase and the joint after pipe formation and heat treatment are a single phase structure of martensite phase or a diploid phase structure of martensite phase and ferrite phase, thus making it possible to improve the strength of the parent phase and the joint. Where the parent phase and the joint are a diploid phase structure of martensite phase and ferrite phase, higher strength is provided as the martensite phase is greater in ratio by volume.

DESCRIPTION OF EMBODIMENTS

Hereinafter, a detailed explanation will be made for embodiments of the present invention.

An explanation will be made for individual elements of a stainless steel material which is a base material of the high-strength stainless steel pipe in the present embodiments and the contents of these elements. The contents of individual elements will be expressed by percent by mass, unless otherwise specified.

[C: 0.04 to 0.12%]

C, which is an element for improving strength, is in particular an important element for improving the strength by dissolving in a parent phase and a joint on heat treatment after pipe formation. In order to obtain the effective strength as stainless steel for constituting a base material of a high-strength stainless steel pipe, it is necessary to contain C at 0.04% or more. However, with an increase in content of C, there is an increase in content of Cr which forms C and carbide. Therefore, a dissolved amount of Cr is decreased to lower corrosion resistance. Further, where the content of C exceeds 0.12%, an excessive amount of carbide is produced to lower ductility and toughness, by which workability at the time of pipe formation is also deteriorated. Therefore, the content of C is to be from 0.04 to 0.12%.

[Ni: 0 to 5.0%]

Ni is an element which is able to prevent reduction in corrosion resistance due to excessive contents of C and N by partially substituting C and N. However, where the content of Ni exceeds 5.0%, residual austenite is increased in content to lower the strength. Therefore, the content of Ni is up to 5.0%. In addition, Cr, that is, a ferrite generating element, and C, N, that is, austenite generating elements, are adjusted for the contents, by which a parent phase of a stainless steel material can be constituted with any one of a single phase structure of ferrite phase, a single phase structure of martensite phase and a diploid phase structure of ferrite phase and martensite phase. And, Ni may not be necessarily contained.

[Cr: 12.0 to 17.0%]

Cr is an element, for improving the corrosion resistance of a parent phase and a joint. This element, is required to be contained at 12.0% or more in order to obtain the effective corrosion resistance as stainless steel which constitutes a base material of a high-strength stainless steel pipe. However, where the content of Cr exceeds 17.0%, it is difficult to obtain a martensite phase by heat treatment after pipe formation. Further, in an attempt to adjust the composition by containing an austenite generating element, an increase in residual austenite will lower the strength of the parent phase and the joint. Therefore, the content of Cr is to be from 12.0 to 17.0%,

[N: 0 to 0.10%]

As with C, N is an element for improving the strength and able to improve the strength by being dissolved in a parent phase in particular by heat treatment after pipe formation. Further, since C can be partially substituted with N, it is possible to prevent reduction in ductility and toughness due to a large content of C. However, where the content of N exceeds 0.10%, the strength will be lowered due to an increase in residual austenite. Therefore, the content of N is up to 0.10%. In addition, N may not be necessarily contained.

[Si: 0.2 to 2.0%]

Si is an element for improving the strength of a parent phase by intensifying dissolution. In order to obtain the effective strength as a stainless steel which constitutes a base material of a high-strength stainless steel pipe, it is necessary to contain Si at 0.2% or more. However, where the content of Si exceeds 3.0%, dissolution intensifying actions are saturated and formation of δ ferrite phase is accelerated to lower the ductility and toughness. Therefore, the content of Si is up to 0.2 to 2.0%.

[Mn: 2.0% or less]

Mn suppresses the generation of β ferrite phase at a high temperature region. Further, Mn has functions to supplement S in the form of MnS and improve the productivity. However, a large content of Mn increases the amount of residual austenite after annealing, which is a cause for reduction in strength. Therefore, the content of Mn is up to 2.0%. It is preferable that the content of Mn is from 0.1 to 1.2%.

[Cu: 0 to 2.0%]

Cu is an element for suppressing the generation of β ferrite phase at a high temperature region and also effective in improving the corrosion resistance. However, where the content of Cu exceeds 2.0%, residual austenice or β ferrite is generated at a parent phase or a welded part, which is a cause for reduction in strength. Therefore, the content of Cu is up to 2.0%. In addition, Cu may not be necessarily contained.

[P: 0.06% or less]

P is an element which is a cause for reduction in corrosion resistance. Therefore, a lower content of P is more desirable. However, an extreme decrease in content of P will result in an increase in production cost. The content of P is up to 0.06% in order to substantially prevent adverse influences.

[S: 0.006% or less]

S is an element which is a cause for causing hot working cracks and rough surfaces by being unevenly separated at grain boundaries at the time of hot rolling to lower hot workability and also causing a cracked edge on cold rolling after intermediate annealing. Further, an excessively large amount of MnS will adversely influence the corrosion resistance. Therefore, a lower content of S is more desirable. However, where the content of S is decreased to an excessive extent, production costs will rise. Thus, the content of S is up to 0.006% in order to substantially prevent adverse influences.

In addition to the above-described elements, Mo of 3.0% or less, B of 0.01% or less and Nb, Ti, V of 0.5% or less may be contained, whenever necessary.

[Mb: 3.0% or less]

Mo is an element for improving the corrosion resistance. However, where the content of Mo exceeds 3.0%, hot workability will be reduced. Further, since Mo is a relatively expensive element, a larger content of the element will increase costs. Therefore, the content of Mo is up to 3.0%

[B: 0.01% or less]

B is an element which forms fine separations to suppress coarsening of grains and also increase a grain-boundary bonding force of ferrite phase with austenite phase in a hot rolling temperature region, thereby improving hot workability. However, where the content of B exceeds 0.01%, low-melting boride is formed to deteriorate hot workability. Therefore, the content of B is up to 0.01%.

[Nb, Ti, V: 0.5% or less]

Nb, Ti and V are elements for making grains fine and then generating separations respectively to improve the strength. However, where the respective contents of Nb, Ti and V exceed 0.5%, the generation of inter-metallic compounds will lower the toughness. Therefore, the respective contents of Nb, Ti and V are up to 0.5%.

Residue excluding the above-described elements is made up of Fe and unavoidable impurities. Compositions are adjusted as described so far, by which a stainless steel material in which a parent phase is constituted with any one of a single phase structure of ferrite phase, a single phase structure of martensite phase and a diploid phase structure of ferrite phase and martensite phase is provided.

The stainless steel material is subjected to heat treatment two times prior to pipe formation. Thereby, carbide is uniformly separated at grain boundaries and within grains of the parent phase, and a dissolved amount of C is adjusted to be 0.03% by mass or less.

The carbide is that which is formed by bonding C with one or more other elements and includes carbonitride in which C and N are bonded with other elements.

Further, a state that carbide is uniformly separated at grain boundaries and within grains is that in which a carbide area ratio at an observation site is 80% or less in deviation at one-micrometer square field observed at 100,000 magnifications by using a transmission electron microscope. A state that carbide is separated in continuation at grain boundaries or within grains is excluded.

The stainless steel material is subjected to a first heat treatment at a material temperature of 600° C. to 850° C. for a soaking period of 0 to 24 h, by which dissolved C is almost entirely separated as carbide.

In this case, carbide is more easily separated at grain boundaries than within grains and separated preferentially at grain boundaries after the first heat treatment. In a state that carbide is preferentially separated at grain boundaries, the toughness is lowered and the workability is deteriorated. Further, since the separated carbide contains chromium carbide which is formed by bonding C with Cr, carbide is preferentially separated locally at grain boundaries, local formation of carbide will decrease a dissolved amount of Cr to form a Cr deficient layer.

The Cr deficient layer is a region where, for example, an amount of Cr is lower by 2% by mass or more than an amount of Cr in a parent phase due to formation of chromium carbide, etc. Since the corrosion resistance is lowered, it is desirable to form no chromium carbide, etc.

Further, after descaling treatment, cold rolling is carried out at a rolling ratio of 20% or more to introduce cold strain.

Then, the stainless steel material is subjected to a second heat treatment at a material temperature within 50° C. different from that of the first heat treatment and for a soaking period of 0 to 1 h. Carbide is uniformly separated at grain boundaries and within grains in the parent phase by the second heat treatment.

Further, a dissolved amount of C in the parent phase is adjusted to he 0.03% by mass or less by the second heat treatment. A larger dissolved amount of C makes the strength of the stainless steel material higher. Where the dissolved amount of C exceeds 0.03% by mass, the strength is excessively high to increase work loads at the time of pipe formation and also deteriorate workability. Therefore, surface defects will be easily made. Further, in a cooling process at the time of pipe formation, dissolved C in a joint is separated through formation of carbide. Where a dissolved amount of C exceeds 0.03% by mass, an amount of Cr which forms chromium carbide, one type of carbide, is excessively increased to easily for a Cr deficient layer. As a result, the dissolved amount of C is up to 0.03% by mass.

As described so far, in the stainless steel material, in view of toughness, corrosion resistance and workability at the time of pipe formation, it is necessary that carbide is uniformly separated at grain boundaries and within grains in the parent phase and the dissolved amount of C is adjusted to be 0.03% by mass or less. Further, it is desirable that no Cr deficient layer is formed.

If the stainless steel material constituting a base material of a high-strength stainless steel pipe is in a state that carbide is uniformly separated at grain boundaries and within grains in the parent phase and the dissolved amount of C in the parent phase is adjusted to be 0.03% by mass or less, it is not always necessary to carry out a first heat treatment, a first cold rolling or a second heat treatment. For example, heat treatment, etc., may be carried out under different conditions.

Then, an end of the base material is used as a joint to form a pipe by conducting melt welding such as TIG welding, MIG welding and high frequency welding.

In the joint after pipe formation, a molten structure different from the parent phase is formed by melt welding.

The stainless steel pipe after pipe formation is subjected to heat treatment at a material temperature of 950 to ° C. for a soaking period of 0 to 1 h. Then, carbide which has been separated in the parent phase and the joint is dissolved, while the parent phase and the joint are in a state that the carbide has been dissolved.

As described above, carbide which has been separated in the parent phase and the joint is dissolved in the parent phase and the joint by heat treatment after pipe formation. Thereby, the parent phase and the joint of the high-strength stainless steel pipe are improved, in strength and corrosion resistance, which is desirable.

A method for dissolving the separated carbide in the parent phase and the joint is not limited to the above-described heat treatment. For example, heat treatment, etc., under different conditions may be carried out.

The stainless steel material in which the parent phase before pipe formation is constituted with any one of a single phase structure of ferrite phase, a single phase structure of martensite phase and a diploid phase structure of ferrite phase and martensite phase is formed into a pipe, which is then subjected to heat treatment. Thereby, a structure that the parent phase and the joint of the stainless steel pipe contain a martensite phase is provided.

As described so far, where a structure which constitutes the parent phase and the joint after heat treatment is a single phase structure of martensite phase or a diploid phase structure of martensite phase and ferrite phase, the parent phase and the joint are favorable in strength, which is desirable.

Where the structure is a diploid phase structure of martensite phase and ferrite phase, a greater ratio by volume of martensite phase will further improve the strength. It is desirable that the ratio by volume of the martensite phase is 30% by volume or more.

A certain content of residual austenite will not substantially affect the strength of the high-strength stainless steel pipe. It is, however, desirable that a ratio by volume of austenite phase is 20% by volume or less.

Next, an explanation will be made for actions and effects of the above-described embodiment.

In production of a high-strength stainless steel pipe, specified compositions are used to give a stainless steel material in which a parent phase is constituted with any one of a single phase structure of ferrite phase, a single phase structure of martensite phase and a diploid phase structure of ferrite phase and martensite phase as a base material.

The above-described base material is subjected to heat treatment ac a material temperature of 600° C. to 850° C. for a soaking period of 0 to 24 h as a first heat treatment. After descaling treatment, the base material is subjected to cold rolling at a cold rolling ratio of 20% or more to introduce cold strain. Further, as a second heat treatment, the base material is subjected to heat treatment at a material temperature within 50° C. different from that of the first heat treatment and for a soaking period of 0 to 1 h. Thereby, carbide is uniformly separated at grain boundaries and within grains in the parent phase and a dissolved amount of C in the parent phase is adjusted to be 0.03% by mass or less.

Further, an end of the base material is used as a joint to form a pipe by melt welding such as TIG welding, MIG welding and high frequency welding. A molten structure different from the parent phase is formed at the joint.

Then, after pipe formation, the base material is subjected to heat treatment at a material temperature of 950° C. to 1100° C. for a soaking period of 0 to 1 h. Thereby, carbide which has been separated in the parent phase and the joint is dissolved in the parent phase and the joint to form a high-strength stainless steel pipe.

The parent phase of the stainless steel material is constituted with a single phase structure of ferrite phase, a single phase structure of martensite phase and a diploid phase structure of ferrite phase and martensite phase. Thereby, after pipe formation, a structure in which the parent phase and the joint contain the martensite phase is provided, thus making it possible to improve the strength of the parent phase and the joint.

In this case, for example, where an austenite phase is contained in the parent phase of the stainless steel material, the austenite phase will easily remain after pipe formation. And, where a large amount of the austenite remains, it is difficult to improve the strength.

The stainless steel material is subjected to heat treatment two times, and carbide is uniformly separated at grain boundaries and within grains in the parent phase. Thereby, it is possible to prevent reduction in workability at the time of pipe formation due to the fact that carbide is preferentially separated locally at grain boundaries to lower the toughness of the parent phase.

Further, the stainless steel material is subjected to heat treatment two times, by which a dissolved amount of C in the parent phase is adjusted to be 0.03% by mass or less. Thereby, it is possible to prevent an increase in work loads at the time of pipe formation and occurrence of work defects on the surface of the stainless steel material due to the fact that a larger dissolved amount of C makes the strength of the stainless steel material excessively high, resulting in deterioration in workability. It is also possible to prevent reduction in corrosion resistance due to an increase in separated carbide with an increase in the dissolved amount of C and also a decrease in the dissolved amount of Cr for forming the separated carbide.

Still, further, carbide is uniformly separated at grain boundaries and within grains in the parent phase and a dissolved amount of C in the parent phase is adjusted to be 0.03% by mass. Thereby, it is possible to prevent the formation of a Cr deficient layer due to the fact that carbide is preferentially separated locally at grain boundaries. It is also possible to prevent formation of the Cr deficient layer due to the fact that carbide is separated locally at the joint in a cooling process at the time of pipe formation.

It is possible to prevent the reduction in corrosion resistance by preventing formation of the Cr deficient layer. Then, it is possible to prevent rust developed on the parent phase and also prevent the possibility of surface quality damage.

A molten structure is formed at a joint by melt welding, by which joints can be reliably put together to form a pipe reliably.

In the parent phase and the joint, separated carbide is dissolved by heat treatment after pipe formation. Therefore, after pipe formation, a state that C is dissolved in the parent phase and the joint is developed, thus making it possible to improve the strength and the corrosion resistance of the parent phase and the joint. Further, at the time of pipe formation prior to heat treatment, a state that carbide is not dissolved in the parent phase or the joint is developed. Thereby, workability is favorable and the pipe can be formed easily.

Further, carbide is dissolved in the parent phase and the joint by heat treatment after pipe formation. It is, thereby, possible to suppress variation in hardness of the parent phase and the joint and also improve dimensional accuracy on working.

The parent phase and the joint after pipe formation and heat treatment are constituted with a single phase structure of martensite phase or a diploid phase structure of martensite phase and ferrite phase. It is, thereby, possible to improve the strength of the parent phase and the joint.

In the thus formed high-strength stainless steel pipe, compositions can he constituted with elements used in an ordinary stainless steel material without using expensive elements. Further, the pipe can be produced at low cost without carrying out any special treatment but carrying out treatment which is used in production processes of ordinary stainless steel pipes.

EXAMPLE 1

Table 1 shows compositions of stainless steel materials as the present embodiment, a comparative example and a conventional example.

The steel grade numbers A to C depict stainless steel materials formed with specified compositions, covering the present embodiment. Further, the steel grade number C depicts a comparative example in which the content of C is lower than the specified compositions. Still further, the steel grade number E depicts a conventional example of SUS 430LX, and the steel grade number F depicts a conventional example of SUS 304.

TABLE 1

| Classification | Steel grade number | C | Ni | Cr | N | Others |
|---|---|---|---|---|---|---|
| Present embodiment | A | 0.068 | 0.12 | 13.31 | 0.016 | Si: 0.48, Mn: 0.82, P: 0.026, S: 0.003, Cu: 1.13 |
| Present embodiment | B | 0.059 | 2.37 | 16.37 | 0.022 | Si: 0.39, Mn: 0.17, P: 0.023, S: 0.002 |
| Present embodiment | C | 0.086 | 4.51 | 15.48 | 0.052 | Si: 1.21, Mn: 1.35, P: 0.031, S: 0.002 |
| Comparative example | D | 0.021 | 4.78 | 14.80 | 0.009 | Si: 0.27, Mn: 0.35, P: 0.024, S: 0.001, Cu: 1.62 |
| Conventional example | E | 0.008 | 0.34 | 17.79 | 0.010 | Si: 0.19, Mn: 0.28, P: 0.037, S: 0.002, Nb: 0.28 |
| Conventional example | F | 0.071 | 8.08 | 18.19 | 0.029 | Si: 0.62, Mn: 0.74, P: 0.032, S: 0.007 |

Regarding the stainless steel materials with compositions shown in Table 1, the 100 kg-steel ingots were respectively used to prepare 3.0 mm-thick rolled plates after hot rolling.

Then, these rolled plates were subjected to processes shown in Table 2 and formed into 1.0 mm-thick stainless steel plates.

Further, regarding these stainless steel materials, a dissolved amount of C was measured to confirm metallic structures and states of separated carbide.

The dissolved amount of C was measured by analysis of extracted residue. The extracted residue was collected by using a solution made up of 10% by mass of $C_5H_8O_2$ (acetyl acetone) +1% by mass of $(CH_3)_4N^+CL^-$ (tetramethylammonium chloride) +$CH_3OH$ (methanol), with a dissolution voltage of 40 to 70 mV. Then, the thus collected residue was measured for weight and subjected to quantitative analysis by using an EPMA (electron probe microanalyzer) (X-ray microanalyzer). Thereby, the content of C in the residue was determined to calculate the dissolved amount of C.

Further, the metallic structures and the separation states of carbide were confirmed in a manner that the respective stainless steel materials were polished, thereafter, submerged into a mixed solution made up of fluoric acid, nitric acid and glycerin at a ratio by volume of 1:1:2, subjected to etching and observed by using an optical microscope.

Table 2 shows the production processes of the respective stainless steel materials in Table 1, dissolved amounts of C, metallic structures and separation states of carbide.

TABLE 2

| | | Stainless steel plate (pipe material) | | |
|---|---|---|---|---|
| Classification | Steel grade number | Production processes | Dissolved amounts of C (% by mass) | Metallic Structures and separation states of carbide |
| Present embodiment | A1 | Annealing (760° C. × 12 h) → Cold rolling (3.0 t/1.0 t) → Annealing (790° C. × 60 s) | 0.017 | Ferrite, uniform separation of carbide |
| Present embodiment | B1 | Annealing (770° C. × 6 h) → Cold rolling (3.0 t/1.0 t) → Annealing (820° C. × 60 s) | 0.024 | Ferrite, uniform separation of carbide |
| Present embodiment | B2 | Annealing (830° C. × 6 h) → Cold rolling (3.0 t/1.0 t) → Annealing (780° C. × 60 s) | 0.018 | Ferrite + Martensite, uniform separation of carbide |
| Present embodiment | C1 | Annealing (710° C. × 8 h) → Cold rolling (3.0 t/1.0 t) → Annealing (700° C. × 60 s) | 0.015 | Martensite, uniform separation of carbide |
| Comparative example | C2 | Annealing (720° C. × 8 h) → Cold rolling (3.0 t/1.0 t) → Annealing (1000° C. × 60 s) → Carbide separation treatment (700° C. × 1 h) | 0.012 | Martensite, carbide separated at grain boundaries |
| Comparative example | C3 | Annealing (720° C. × 8 h) → Cold rolling (3.0 t/1.0 t) → Annealing (1000° C. × 60 s) | 0.081 | Martensite, minimum carbide |
| Comparative example | D1 | Annealing (710° C. × 8 h) → Cold rolling | 0.009 | Martensite, minimum carbide |

TABLE 2-continued

| Classification | Steel grade number | Production processes | Dissolved amounts of C (% by mass) | Metallic Structures and separation states of carbide |
|---|---|---|---|---|
| Comparative example | E1 | (3.0 t/1.0 t) → Annealing (700° C. × 60 s) Annealing (920° C. × 60 h) → Cold rolling (3.0 t/1.0 t) → Annealing (900° C. × 60 s) | 0.006 | Ferrite, minimum carbide |
| Comparative example | F1 | Annealing (1080° C. × 60 h) → Cold rolling (3.0 t/1.0 t) → Annealing (1090° C. × 60 s) | 0.068 | Austenite, minimum carbide |

The steel grade number A1 covers the present embodiment. A stainless steel material with compositions of the steel grade number A in Table 1 was subjected to annealing at a material temperature of 760° C. for a soaking period of 12 h as a first heat treatment, and the stainless steel material with 3 mm thickness was cold rolled to give the stainless steel material with 1 mm thickness, which was thereafter further subjected to annealing at a material temperature of 790° C. for a soaking period of 60 s as a second heat treatment. Further, the dissolved amount of C was 0.017% by mass and the metallic structure was that in which the parent phase was constituted with a single phase structure of ferrite phase, and carbide was uniformly separated.

The steel grade number B1 covers the present embodiment. A stainless steel material with compositions of the steel grade number B in Table 1 was subjected to annealing at a material temperature of 770° C. for a soaking period of 6 h as a first heat treatment and the stainless steel material with 3 mm thickness was cold rolled to give the stainless steel material with 1 mm thickness, which was further subjected to annealing at a material temperature of 820° C. for a soaking period of 60 s as a second heat treatment. Further, the dissolved amount of C was 0.024% by mass, and the metallic structure was that in which the parent phase was constituted with a single phase structure of ferrite phase, and carbide was uniformly separated.

The steel grade number B2 covers the present embodiment. A stainless steel material with compositions of the steel grade number B in Table 1 was subjected to annealing at a material temperature of 830° C. for a soaking period of 6 h as a first heat treatment, and the stainless steel material with 3 mm thickness was cold rolled to give the stainless steel material with 1 mm thickness, which was thereafter subjected to annealing at a material temperature of 780° C. for a soaking period of 60 s as a second heat treatment. Further, the dissolved amount of C was 0.018% by mass, and the metallic structure was that in which the parent phase was constituted with a diploid structure of ferrite phase and martensite phase, and carbide was uniformly separated.

The steel grade number C1 covers the present embodiment. A stainless steel material with compositions of the steel grade number C in Table 1 was subjected to annealing at a material temperature of 710° C. for a soaking period of 8 h as a first heat treatment, and the stainless steel material with 3 mm thickness was cold rolled to give the stainless steel material with 1 mm thickness, which was thereafter subjected to annealing at a material temperature of 700° C. for a soaking period of 60 s as a second heat treatment. Further, the dissolved amount of C was 0.015% by mass and the metallic structure was that in which the parent phase was constituted with a single phase structure of martensite phase, and carbide was uniformly separated.

The steel grade number C2 covers a comparative example. A stainless steel material with compositions of the steel grade number C in Table 1 was subjected to annealing at a material temperature of 720° C. for a soaking period of 8 h as a first heat treatment, and the stainless steel material with 3 mm thickness was cold rolled to give the stainless steel material with 1 mm thickness, which was thereafter subjected to annealing at a material temperature of 1000° C. for a soaking period of 60 s as a second heat treatment. Further, the stainless steel material was subjected to heat treatment at a material temperature of 700° C. for a soaking period of 1 h, by which carbide was separated at grain boundaries. Still further, the dissolved amount of C was 0.012% by mass and the metallic structure was that in which the parent phase was constituted with a single phase structure of martensite phase. Carbide was preferentially separated at grain boundaries.

The steel grade number C3 covers a comparative example. A stainless steel material with compositions of the steel grade number C in Table 1 was subjected to annealing at a material temperature of 720° C. for a soaking period of 8 h as a first heat treatment, and the stainless steel material with 3 mm thickness was cold rolled to give the stainless steel material with 1 mm thickness, which was thereafter subjected to annealing at a material temperature of 1000° C. for a soaking period of 60 s as a second heat treatment. Further, the dissolved amount of C was 0.081% by mass and the metallic structure was that in which the parent phase was constituted with a single phase structure of martensite phase. Carbide was almost entirely dissolved in the parent phase, and the carbide was hardly separated.

The steel grade number D1 covers a comparative example. A stainless steel material with compositions of the steel grade number D in Table 1 was subjected to annealing at a material temperature of 710° C. for a soaking period of 8 h as a first heat treatment, and the stainless steel material with 3 mm thickness was cold rolled to give the stainless steel material with 1 mm thickness, which was thereafter subjected to annealing at a material temperature of 700° C. for a soaking period of 60 s as a second heat treatment. Further, since the content of C was low, the dissolved amount of C was also low, that is, 0.009% by mass. The metallic structure was that in which the parent phase was constituted with a single phase structure of martensite phase, and carbide was hardly separated.

The steel grade number E1 covers a comparative example. A stainless steel material with compositions of the steel grade number E in Table 1 was subjected to annealing at a material temperature of 920° C. for a soaking period of 60 h as a first heat treatment, and the stainless steel material with 3 mm thickness was cold rolled to give the stainless steel material with 1 mm thickness, which was thereafter subjected to annealing at a material temperature of 900° C. for a soaking period of 60 s as a second heat treatment. Further, since the content of C was low, the dissolved amount of C was also low, that is, 0.006% by mass. The metallic structure was that in which the parent phase was constituted with a single phase structure of ferrite phase, and carbide was hardly separated.

The steel grade number F1 covers a comparative example. As with ordinary production processes of SUS304, a stainless steel material with compositions of the steel grade number F Table 1 was subjected to annealing at a material temperature of 1080° C. for a soaking period of 60 h as a first heat treatment, and the stainless steel material with 3 mm thickness was cold rolled to give the stainless steel material, with 1 mm thickness, which was thereafter further subjected to annealing at a material temperature of 1090° C. for a soaking period of 60 s as a second heat treatment. Further, the dissolved amount of C was 0.068% by mass. The metallic structure was that in which the parent phase was constituted with a single phase structure of austenite phase, and carbide was hardly separated.

Although omitted in Table 2, scales were removed from the respective stainless steel materials by acid cleaning after annealing.

In the stainless steel materials shown in Table 2, joints were bonded, by high frequency welding to form pipes. That is, stainless steel pipes with an outer diameter of 38.1 mm were prepared and evaluated for workability and corrosion resistance.

Workability was evaluated by macroscopically confirming whether any cracks or surface defects were found on individual stainless steel pipes after pipe formation. Where no cracks or surface defects were confirmed, ○ was given. Where they were found, × was given.

The corrosion resistance was evaluated by conducting a CASS (copper accelerated acetic acid salt spray) test in accordance with the CASS test method of JIS H8502 after removal of scales on a joint by using a grinder. A test solution used in the CASS test was that in which 5% by Mass of NaCl (sodium chloride aqueous solution)+0.268 g/LCuCl$_2$ (copper chloride) +CH$_3$COOH (acetic acid) were adjusted to be pH 3.0 to 3.1, and the test was conducted at temperatures of 50 ∓2° C. Further, in the CASS test, each of the stainless steel plates was measured two times. And, these stainless steel plates were set in a test tank and subjected to spray of the test solution. Then, after 200 hours, the parent phase and the joint were macroscopically confirmed for the presence or absence of rust development. Where no rust development was confirmed, ○ was given. Where rust development was found, × was given.

Table 3 shows the results of workability evaluation and corrosion resistance evaluation.

TABLE 3

| Classification | Steel grade number | Workability evaluation | | Corrosion resistance evaluation ○: no rust development found x: rust development found |
|---|---|---|---|---|
| | | Presence or absence of cracks ○: no cracks found x: cracks found | Presence or absence of surface defects ○: no defects found x: defects found | |
| Present embodiment | A1 | ○ | ○ | ○ |
| Present embodiment | B1 | ○ | ○ | ○ |
| Present embodiment | B2 | ○ | ○ | ○ |
| Present embodiment | C1 | ○ | ○ | ○ |
| Comparative example | C2 | x | ○ | x |
| Comparative example | C3 | x | x | x |
| Comparative example | D1 | ○ | ○ | ○ |
| Comparative example | E1 | ○ | ○ | ○ |
| Comparative example | F1 | ○ | ○ | x |

As shown in Table 3, no cracks or surface defects were found on any one of high-strength stainless steel pipes of steel grade numbers A1, B1, B2, C1 covering the present embodiment. Further, no rust development after the CASS test was confirmed either. Therefore, workability and corrosion resistance were favorable.

On the other hand, in the stainless steel pipe of the steel grade number C2 covering a comparative example, with carbide preferentially separated at grain boundaries, cracks were confirmed. Therefore, workability was insufficient. This was considered to be due to the fact that since carbide was preferentially separated at grain boundaries, toughness was decreased to deteriorate workability. Further, rust development was confirmed in the parent phase and the joint, therefore, corrosion resistance was insufficient. This was considered to be due to the fact that since carbide was locally separated au grain boundaries, a Cr deficient layer was formed around the carbide to result in a decrease in corrosion resistance.

In the stainless steel pipe of the steel grade number C3 covering a comparative example in which C was almost entirely dissolved in the parent phase, the pipe was high in strength at the time of pipe formation and, therefore, the pipe was difficult in formation. Further, since surface defects were found, workability was insufficient. This was considered to be due to the fact that a dissolved amount of C exceeded 0.03% by mass and the strength was increased excessively to deteriorate workability. Still further, since rust development was confirmed on a joint, corrosion resistance was insufficient. This was considered to be due to the fact that the dissolved amount of C exceeded 0.03% by mass, a large amount of carbide was separated on the joint in a cooling process at the time of pipe formation, and the formation of carbide resulted in a Cr deficient layer formed on the joint, thereby the joint was decreased in corrosion resistance.

In the stainless steel pipes of the steel grade numbers D1, E1 covering comparative examples, no cracks or surface defects were found after pipe formation, and no rust development was confirmed either after the CASS test. Therefore, workability and corrosion resistance were favorable.

In the stainless steel pipe of the steel grade number F1 which covers a comparative example and is ordinary SUS 304, no cracks or surface defects were confirmed after pipe formation. Therefore, workability was favorable. However, since rust development was confirmed on a joint after the CASS test, corrosion resistance was insufficient. This was considered to be due to the fact that a dissolved amount of C exceeded 0.03% by mass, a large amount of carbide was separated on the joint in a cooling process at the time of pipe formation, and the generation of carbide resulted in formation of a Cr deficient layer, thereby the joint was decreased in corrosion resistance.

The stainless steel pipes of the steel grade numbers A1, B1, B2, C1, D1 and E1 favorable in workability evaluation and corrosion resistance evaluation as shown in Table 3 were subjected to heat treatment after pipe formation. And, they were examined for metallic ;structures, examined for the presence or absence of separated carbide, measured for tensile strength and evaluated for corrosion resistance.

The steel grade number A1-1 covers the present embodiment After the stainless steel pipe of the steel grade number A1 in Table 3 was formed, the pipe was subjected to heat treatment at a material temperature of 980° C. for a soaking period of 60 s.

The steel grade number A1-2 covers a comparative example. After the stainless steel pipe of the steel grade number A1 in Table 3 was formed, the pipe was not subjected to heat treatment but kept as it was, with carbide being separated.

The steel grade number B1 covers the present embodiment. After the stainless steel pipe of the steel grade number B1 in Table 3 was formed, the pipe was subjected to heat treatment at a material temperature of 1030° C. for a soaking period of 60 s.

The steel grade number B2 covers the present embodiment. After the stainless steel pipe of the steel grade number B2 in Table 3 was formed, the pipe was subjected heat treatment at a material temperature of 1030° C. for a soaking period of 60 s.

The steel grade number C1 covers the present embodiment. After the stainless steel pipe of the steel grade number C1 in Table 3 was formed, the pipe was subjected to heat treatment at a material temperature of 1050° C. for a soaking period of 60 s, The steel grade number D1 covers a comparative example. After the stainless steel pipe of the steel grade number D1 in Table 3 was formed, the pipe was subjected to heat treatment at a material temperature of 1030° C. for a soaking period of 60 s.

The steel grade number E1 covers a comparative example. After the stainless steel pipe of the steel grade number E1 in Table 3 was formed, the pipe was subjected to heat treatment at a material temperature of 1000° C. for a soaking period of 60 s.

The metallic structures were studied and the presence or absence of carbide in the parent phase and the joint was examined according to a method similar to that for measuring the above-described stainless steel plates.

The tensile strength was measured, with a 300 mm-long stainless steel pipe fixed at the both ends thereof, by conducting a tensile test at a crosshead speed of 3 mm/min.

The corrosion resistance was evaluated by a wet-dry salt composite cycle study, the conditions of which were more severe than those of the above-described CASS test, with consideration given to tougher use environments. The wet-dry salt composite study is a test method that a salt-water spraying step for spraying 5% by mass NaCl (sodium chloride) on a 150 mm-long test piece at 35° C. for 900 s, a drying step for keeping the test piece at an ambient temperature of 60° C. at a humidity of 35% for 3.6 ks and a humidity step for keeping the test piece at an ambient temperature of 50° C. at a humidity of 95% for 10.8 ks are given as one cycle, which is repeated five times, and macroscopic confirmation is made for whether any rust development is found.

Table 4 shows the results which cover the presence or absence of metallic structures, the presence or absence of separated carbide, measurement of tensile strength and evaluation of corrosion resistance.

TABLE 4

| | | | Stainless steel plate (pipe material) | | | |
|---|---|---|---|---|---|---|
| Classification | Steel grade number | Heat treatment conditions after pipe formation | Metallic structures (% by volume) | Separated carbide o: not found x: found | Tensile strength (N/mm$^2$) | Corrosion resistance evaluation o: no rust development found x: rust found |
| Present embodiment | A1-1 | 980° C. × 60 s | Martensite 90% + Ferrite 10% | o | 1255 | o |
| Comparative example | A1-2 | — (No heat treatment was provided) | Ferrite 100% | x | 610 | x |
| Present embodiment | B1 | 1030° C. × 60 s | Martensite 75% + Ferrite 25% | o | 1205 | o |
| Present embodiment | B2 | 1030° C. × 60 s | Martensite 75% + Ferrite 25% | o | 1200 | o |
| Present embodiment | C1 | 1050° C. × 60 s | Martensite 90% + Austenite 10% | o | 1560 | o |
| Comparative example | D1 | 1030° C. × 60 s | Martensite 100% | o | 865 | o |
| Comparative example | E1 | 1000° C. × 60 s | Ferrite 100% | o | 545 | o |

As shown in Table 4, the high-strength stainless steel pipes of the steel grade numbers A1-1, B1, B2 and C1 covering the present embodiment were 1200 (N/mm$^2$) or more in tensile strength and, therefore, favorable in strength. Further, no rust development was confirmed by evaluation of corrosion resistance. Therefore, the corrosion resistance was favorable.

The stainless steel pipe of the steel grade number A1-2 covering a comparative example was 610 (N/mm$^2$) in tensile strength and insufficient in strength. Further, rust development was confirmed by evaluation of corrosion resistance, and the corrosion resistance was insufficient. This was considered to be due to the fact that no heat treatment was provided after pipe formation, by which a state that carbide was separated was developed, and the parent phase and the joint were constituted with a single phase structure of ferrite phase to result in insufficient strength and corrosion resistance.

The stainless steel pipe of the steel grade number D1 covering a comparative example was favorable in corrosion resistance but 865 (N/mm$^2$) in tensile strength and, therefore, insufficient in strength. This was considered to be due to the fact that, with regard to the compositions of the stainless steel material, that is, a base material, the content of C was lower than that of C specified in the present invention and the strength was insufficient.

The stainless steel pipe of the steel grade number E1 covering a comparative example was favorable in corrosion resistance but 545 (N/mm$^2$) in tensile strength and, therefore, insufficient in strength. This was considered to be due to the fact that, as a stainless steel material, that is, a base material, SUS430LX of a conventional example was used, and the content of C was lower than that of C specified in the present invention, the parent phase and the joint were constituted with a single phase structure of ferrite phase, and the strength was therefore insufficient.

As described so far, the stainless steel materials having specified compositions are kept in a specified state before and after pipe formation. Thereby, the high-strength stainless steel pipe can be improved in workability, strength and corrosion resistance.

EXAMPLE 2

The stainless steel pipes of the steel grade numbers A1-1, A1-2, B1, B2 and C1 in Table 4 as well as the stainless steel pipe of the steel grade number C3 in Table 3 were subjected to heat treatment after pipe formation and evaluated for roundness, crack resistance by a flattening test and dimensional accuracy after bending. No heat treatment was provided for the steel grade numbers A1-2 and C3 after pipe formation.

The pipe was measured for the diameter circumferentially at eight points at intervals every 45° to evaluate the roundness. Where a difference between a maximum diameter and a minimum diameter at these eight points was within 0.2 mm, the roundness was considered to be favorable and ○ was given. Where a difference exceeded 0.2 mm, the roundness was considered to be insufficient and × was given.

The crack resistance was evaluated by the flattening test in such a manner that a stainless steel pipe was set so that a weld bead portion of the 300 mm-long stainless steel pipe was perpendicular with respect to a compression direction and compressed to 19.05 mm which was half of the pipe diameter. Then, macroscopic confirmation was made for whether any cracks were found after compression. Where no cracks were confirmed, ○ was given. Where cracks were confirmed, × was given.

Dimensional accuracy after bending was evaluated in a manner that the pipe was set so that the weld bead portion was placed outside the bending and subjected to rotational drawing/bending at a predetermined bending angle of 130° and measured 30 times. Then, after bending, a protractor was used to measure an actual angle. Where variation in actual angle was within 1°, the dimensional accuracy was favorable and ○ was given. Where the variation exceeded 1°, the dimensional accuracy was insufficient and × was given.

Table 5 shows the results covering roundness evaluation, crack evaluation and dimensional accuracy evaluation.

TABLE 5

| | | | Stainless steel plate (after heat treatment) | | |
| --- | --- | --- | --- | --- | --- |
| Classification | Steel grade number | Heat treatment conditions after pipe formation | Roundness ○: (difference between maximum and minimum) ≤0.2 mm ×: (difference between maximum and minimum) >0.2 mm | Crack resistance evaluation by flattening test ○: no cracks found ×: cracks found | Dimensional accuracy after bending ○: variation in angle ≤1° ×: variation in angle >1° |
| Present embodiment | A1-1 | 980° C. × 60 s | ○ | ○ | ○ |
| Comparative example | A1-2 | — (No heat treatment) | ○ | ○ | × |
| Present embodiment | B1 | 1030° C. × 60 s | ○ | ○ | ○ |
| Present embodiment | B2 | 1030° C. × 60 s | ○ | ○ | ○ |
| Present embodiment | C1 | 1050° C. × 60 s | ○ | ○ | ○ |
| Comparative example | C3 | — (No heat treatment) | × | ○ | × |

As shown in Table 5, the stainless steel pipes of the steel grade numbers A1-1, B1, B2 and C1 covering the present embodiment were all favorable in roundness, crack resistance and dimensional accuracy.

On the other hand, the stainless steel pipe of the steel grade number A1-2 covering a comparative example was insufficient in dimensional accuracy. This was considered to be due to the fact that before pipe formation, carbide was separated in the parent phase and the joint, the carbide was dissolved only in the joint by melt welding at the time of pipe formation, and no heat treatment was provided after pipe formation, that is, no carbide was dissolved in the parent phase, while the carbide was dissolved in the joint, thereby the parent phase and the joint were not uniform in hardness, resulting in deterioration in dimensional accuracy.

Further, the stainless steel pipe of the steel grade number C3 covering a comparative example was insufficient in roundness. This was considered to be due to the fact that C was dissolved in the parent phase and the joint by a second heat treatment, consequently high strength made pipe formation difficult, and the pipe was therefore insufficient in roundness after pipe formation. The pipe was also insufficient in dimensional accuracy. This was considered to be due to the fact that before pipe formation, C was dissolved in the parent phase and the joint, carbide was separated only in the joint in a cooling process at the time of pipe formation, then, no heat treatment was provided after pipe formation, therefore, C was dissolved in the parent phase, while no C was dissolved in the joint, by which the parent phase and the joint were not uniform in hardness to result in deterioration in dimensional accuracy.

As described so far, the stainless steel materials having specified compositions are kept in a state before and after pipe formation as specified. It is, thereby, possible to improve the workability and dimensional accuracy of the high-strength stainless steel pipe.

INDUSTRIAL APPLICABILITY

The present invention is applicable to a high-strength stainless steel pipe which requires strength and corrosion resistance and is used for transportation, machine construction, architecture, decoration, etc.

The invention claimed is:

1. A high-strength stainless steel pipe, wherein, as a base material, a stainless steel material which contains on the basis of percent by mass, C from 0.04 to 0.12%, Ni from 0 to 5.0%, Cr from 12.0 to 17.0%, N at 0.022% or less, Si from 0.2 to 2.0%, Mn at 2.0% or less, Cu from 0 to 2.0%, P at 0.06% or less, S at 0.006% or less, with residue being Fe and unavoidable impurities, and in which a parent phase is constituted with any one of a single phase structure of ferrite phase, and a diploid phase structure of ferrite phase and martensite phase, in which carbide is uniformly separated at grain boundaries and within grains, and which is 0.03% or less in a dissolved amount of C, is used, the high-strength stainless steel pipe includes a joint in which a molten structure resulting from melt-welded is formed, and the parent phase and the joint after heat treatment are those in which separated carbide is dissolved, and are a diploid phase structure including martensite phase and 10% or more and 25% or less by volume of ferrite phase.

* * * * *